Dec. 5, 1939.  E. E. LINDSEY  2,182,522
MECHANICAL MOVEMENT
Filed Nov. 30, 1937  2 Sheets-Sheet 1
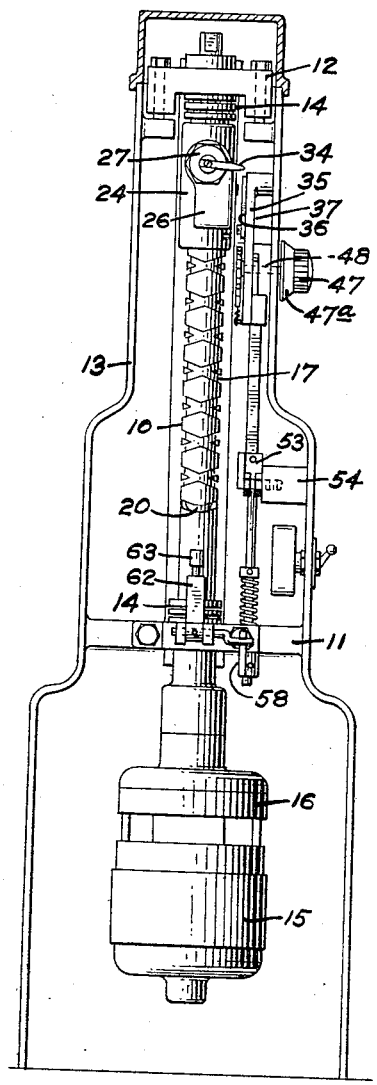
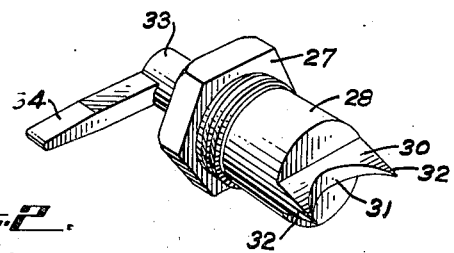
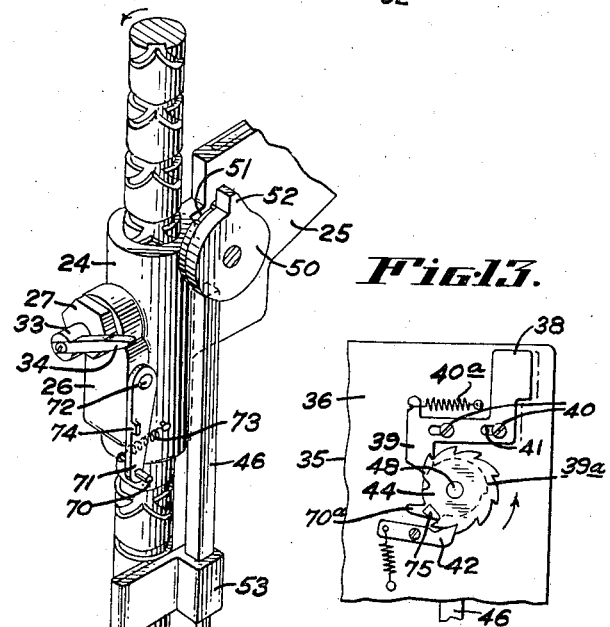
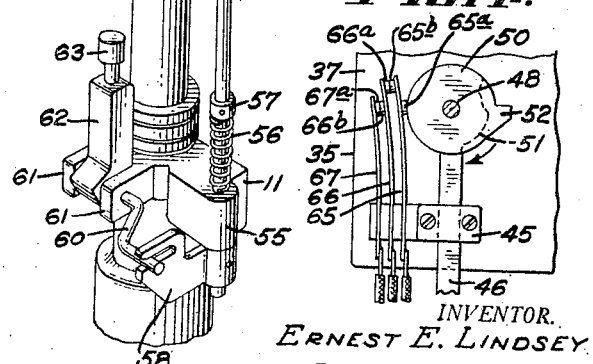
INVENTOR.
ERNEST E. LINDSEY
BY Owen and Hardy
ATTORNEYS.

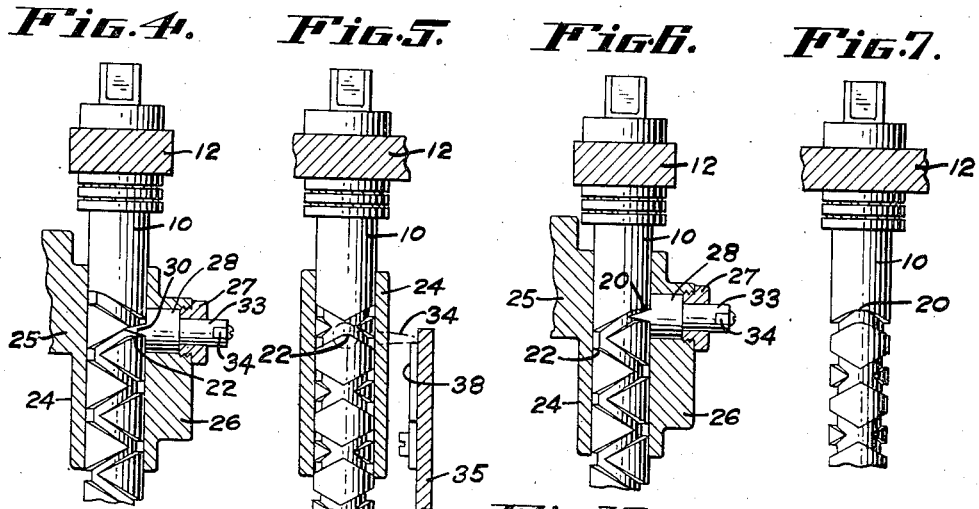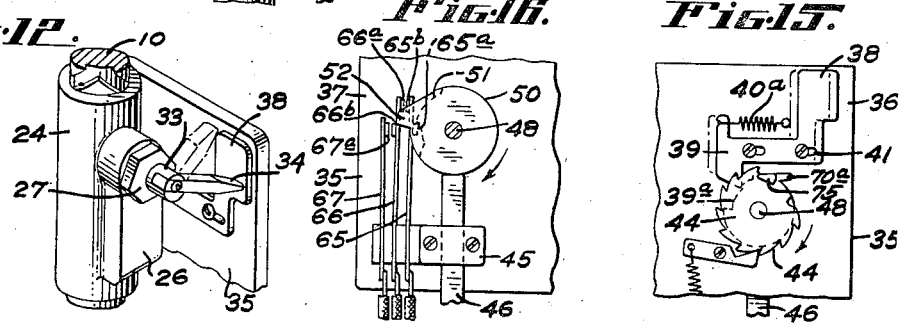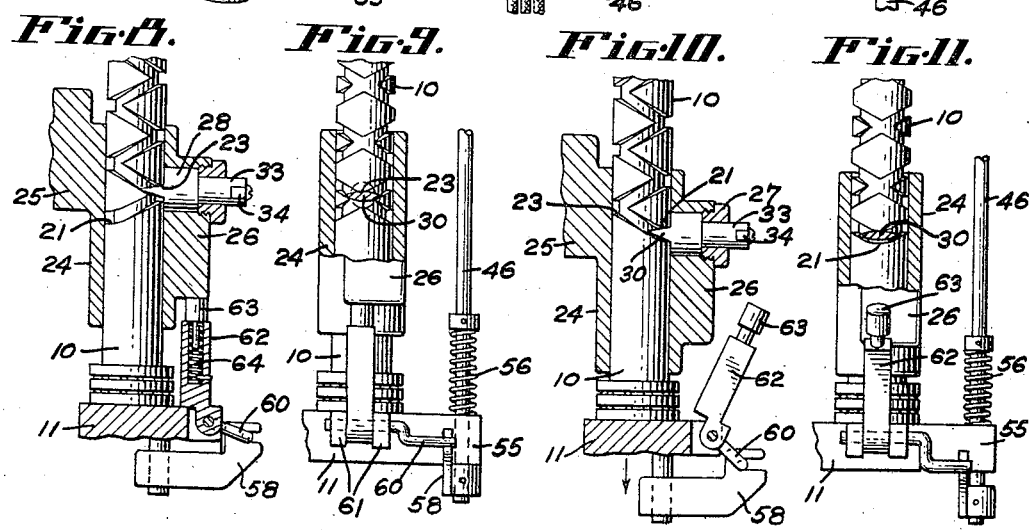

Patented Dec. 5, 1939

2,182,522

UNITED STATES PATENT OFFICE 2,182,522

MECHANICAL MOVEMENT

Ernest E. Lindsey, Los Angeles, Calif., assignor to Insta-Freeze Corporation, a corporation of California Application November 30, 1937, Serial No. 177,268

16 Claims. (Cl. 74—57)

The invention relates to means for translating one form of mechanical movement to another, and more particularly to a device for translating rotary movement into reciprocating movement of varying length stroke, by means of a reversing screw shaft.

Heretofore, where the concept of reversing screw shafts has been utilized, in one form or another, to accomplish reciprocating movement, it has been necessary for the cam follower, "dog", or similar member traveling in the thread of the screw to complete the entire course of the thread in one direction before reversing. The nature of the structure required the entire stroke to be completed in both directions during the entire period in which the machine is operated.

In the invention herein, it is an object to provide controlled reciprocating motion so that the length of each stroke can be set in advance and run in accordance with the setting without interruption or stopping of the movement; to have any desired combination of different length strokes in any sequence to be run through; to increase the scope of work of the translated rotary movement by the provision of variable strokes and combinations of them subject to accurate control; to provide such a device in such simplicity that no skill is required to operate, and where all the control is within the device itself.

The invention contemplates such other and further objects as will appear as the description of the invention proceeds.

In attaining the foregoing objects, together with such further benefits, advantages, and capabilities as may hereafter appear, and as are inherently possessed thereby, there is used by way of example only, the construction shown in preferred form in the accompanying two sheets of drawings, wherein similar parts are designated by the same reference characters in the several views.

Referring to the drawings:

Fig. 1 is an elevational view of a device embodying the mechanical movement of the present invention;

Fig. 2 is a perspective view of the device with the housing and switch control removed;

Fig. 3 is an enlarged perspective view of a swiveled "dog" member;

Fig. 4 is a fragmentary side elevation at the top of the shaft, showing the blade of the swiveled "dog" member at the point of reverse short of the full stroke;

Fig. 5 is a similar view in front elevation;

Fig. 6 is a fragmentary side elevation at the portion of the shaft showing the blade of the swiveled "dog" member at the point of reverse at the extremity of the full stroke;

Fig. 7 is a similar view in front elevation;

Fig. 8 is a fragmentary side elevation of the bottom portion of the shaft with the blade of the swivel "dog" member at the point of reversal short of the full stroke;

Fig. 9 is a similar view in front elevation;

Fig. 10 is a fragmentary view in side elevation of the bottom portion of the shaft showing the swivel "dog" member at the point of reversal at the full maximum stroke;

Fig. 11 is a similar view in front elevation;

Fig. 12 is a fragmentary view in perspective showing the arm attached to the swivel "dog" member in contact with the switch trigger mechanism;

Fig. 13 shows the switch actuating mechanism on one side of the switch block when turned to #5 on the dial;

Fig. 14 shows the switch control mechanism on the other side of the switch block when turned to #5 on the dial;

Fig. 15 shows the switch actuating mechanism similar to Fig. 13 but in "off" position on the dial; and Fig. 16 shows the switch control mechanism of Fig. 14 in "off" position on the dial.

Referring now more particularly to the drawings of the device for converting rotary movement into reciprocating movement, shaft 10 is supported and journaled in cross webs 11 and 12 which are mounted on the housing 13. Suitable bearings 14 are provided to insure smooth even running. The shaft 10 is rotated by a motor 15, either directly or through a reduction gear 16 or similarly any other speed changing device.

In the shaft 10 is cut an endless groove 17, traversing the shaft in oppositely directed and intersecting spirals, the points of reversal of the spirals defining the limits of the longest stroke of which the device is capable. The endless groove formed continuous intersecting spiral paths leading up and down (or back and forth) along the shaft. The crossing and recrossing of the endless groove form identically spaced lozenge shaped units or lands along the shaft when viewed in either front or rear elevation (see Figs. 1, 5, 7, 9 and 11). At the lowermost point of the groove 17 and also at the uppermost point, the last full lozenge shaped unit 18 has at the point of reverse one point of the obtuse angle rounded as at 20 and 21 to facilitate the reversal of direction and otherwise promote smooth, continuous operation. Inasmuch as the description will be confined to a change of stroke, which stops short of a complete traverse at both top and bottom, to aid in a clear and concise exposition of the device and its operation, it is to be understood that this is by way of illustration only and without restriction as to other and different courses of travel and combinations thereof which will readily be aparent to those skilled in the art. For the purposes of the example, the next to last complete lozenge at both ends of the course on the shaft are similarly rounded at one of the obtuse angles as at 22 and 23 and for similar reasons. Thus, the shortest path of travel or stroke possible will be between 22 and 23, and, as will be described later, other possible combinations include the short travel and reverse at the top, and the full travel at the bottom, or vice versa.

Around a portion of the shaft 10 and slidably mounted thereon is a bearing sleeve member 24 which may be substantially cylindrical in form as shown in Figs. 2 and 12 particularly. Suitably attached to and secured by the sleeve 24 is arm 25 which may be the means for imparting the reciprocating movement to whatever purpose may be desired. Integral with and carried by the bearing sleeve 24 is a built up portion 26, with a threaded opening therethrough to the shaft 10 and adapted to receive the threaded nut 27. Also received within the opening and riding freely therein, is a swiveled "dog" member 28 having a groove engaging blade 30. The blade 30 is generally wedge shaped in cross section, and cut out between its longitudinal extremities in an arc as at 31, conforming to the diameter of the shaft 10 at the base of the groove 17. This, in effect, provides the blade 30 with marginally extending teeth 32 which are a sufficient distance apart to provide bearing at the intersection of the groove at the opposite sides thereof, and in the same direction of travel. A stub-shaft 33 extends outwardly from the swivel "dog" member 28, and passes through an opening in the threaded nut 27 so that the shaft is freely rotatable therein. At the outer end of the stub-shaft a tapering contact arm 34 is suitably mounted and preferably lies parallel to the longitudinal line of the blade 30 for additional visual directional indication. Obviously, the purpose of the threaded nut 27 is to hold the blade 30 of the swivel member 28 in operative engagement within the groove of the shaft without in any way affecting its free rotating movement. As this is a point of wear, the threaded nut 27 is preferably provided with a suitable bushing.

Mounted inside the housing 13 and adjacent the shaft 10, there is a suitable switch block 35, which is preferably in the form of a panel having two available faces, an inside face 36 and an outside face 37. On the inside face 36 is mounted trigger switch plate 38 which rides smoothly within the limits of slots 41 on screws 40. Tension spring 40a tends to urge the trigger plate at all times to the position shown in broken line in Fig. 13 and keeps leg 39 in contact with cam 39a which is integral with ratchet 44, as a cam follower. Spring pawl 42 is pivotally mounted on this surface to hold ratchet 44 against reverse movement. On the outside face 37 is mounted bracket 45 for slidably positioning push rod 46. Knob 47, which controls the setting, rotates shaft 48 in making the setting. On the inner end of the shaft 48 is attached the ratchet 44, and on the same shaft but positioned between the outer face and the inner wall of the housing, are the rod actuating cam 50 and the electrical circuit cam 51 which may be integrally joined. Adjacent the cam 51 are flexible contact switch poles 65, 66 and 67. On 65 there are two contact points 65—a which acts as a cam follower moving in accordance with the contour of cam 51 and the other 65—b making contact with the live wire contact point 66a to close the circuit and operate the motor 15. Switch pole 66 also has another electrical contact 66b contacting with point 67a for a secondary circuit also controlled by the contour of cam 51.

Adjacent the shaft 10, and substantially parallel thereto, is the push rod 46 which is actuated by peripheral lug 52 on the push rod actuating cam 50. In addition to these slidable end brackets 45 it is also slidably mounted in bracket 53 which is attached to spacer 54, mounted on the housing 13. The push rod 46 extends on through ear 55 on cross-web 11. The tension holding the push rod against the cam 50 is supplied by the helical tension spring 56, which is positioned between the ear 55 and the collar 57. Attached to the lower end of the push rod 46 is a fork member 58 which engages crank 60, which is rotatably secured in parallel arm 61 and firmly secured to the stop member 62. A portion thereof rests on cross-web 11. (See Fig. 8.) Stop member 62 is provided with a piston-like member 63, which, when in operative engagement, works against the tension of helical spring 64 inside the body of stop member 62.

Operation

The motor for the rotation of the shaft 10 operates in one direction only, and for the purpose of describing the operation herein it is assumed that the rotation will be anti-clockwise when the shaft is viewed from the top or from left to right in Fig. 1.

The operation of the motor 15 and the rotation of shaft 10 is normally subject to the control of the selective switches 65 and 66 as controlled and set by knob 47, although it is to be understood that if the number of complete circuits or up and down strokes is to be always the same, then, an on and off switch is all that is necessary. The knob 47 is equipped with a dial 47a having numbers representing complete circuits of travel. For example, if the knob of the selective switch 47 is turned to the number 5 on the dial, the motor will start, and the arm 28 will make five round trips before coming to a stop. This is regardless of whether or not the strokes are the maximum for the device or any intermediate circuit or in varied groupings.

For the purpose of making the explanation of the operation, the dial setting is in "off" position with contact broken such as is shown in Figs. 15 and 16, and the device at rest substantially as shown in Fig. 1. Then assume that the device is started by turning the knob 47 on the selective switch to the numeral 5 on the dial 47a thereof. The turning of the knob rotates the ratchet 44 and cams 39a, 50 and 51 to the position shown in Figs. 13 and 14. Upon this rotation the contacts 66a and 65b are made to close the circuit and start the motor 15. (Also, the secondary circuit is closed as here shown if desired, although it need not be. The control of the secondary circuit is obviously in the shape of the cam. The secondary circuit is not necessary for this movement but will be included as exemplifying a range of control.) Upon the rotation of the motor and shaft 10 the bearing sleeve 24 immediately begins its downward portion of stroke 1 with the blade 30 of the swiveled "dog" member 28 following in the groove 17. The arm 34 is in the position shown in broken line in Fig. 12 and gives a visual indication of the course of progress. The lug 52 on cam 50 not being in operative position to depress the push rod 46, the built up portion 26 on the bearing sleeve contacts the head of plunger 63 compressing the spring 64, substantially as shown in Figs. 8 and 9. The full travel of the plunger is reached precisely at the moment of reverse at the point less than the full travel, on the shaft 10 and the restraint with the aid of the bracket 53 to support any possible strain to cause the swiveled "dog" member to reverse its direction and start on the upward portion of stroke 1. On the way up the lifting pawl 20 carried on arm 71 pivotally mounted at 72 on the built up portion 26 and further held in engaging position by spring 73, engages a tooth on the ratchet 44 and rotates the shaft 48, causing the dial 47a to turn back one space to the numeral 4. When the blade 30 reaches the rounded point 22, which is short of the full travel, it will not continue upward but will follow the easier course and reverse to go on the downward portion of stroke 2. There is sufficient weight and balance as well as downward pull to make this the easier course although precisely the same means as used at the bottom could be used for reversing short of the full stroke at the top. Strokes 2 and 3 are the same as 1, with the lifting pawl 70 engaging a ratchet tooth on the upward travel and rotating shaft 48 one space on the dial 47a at a time. On the downward portion of stroke 4, the lug 52 on cam 50 comes into operative engagement with push rod 46 forcing the rod downwardly, compressing spring 56 and depressing the crank arm 60, causing the stop 62 and the plunger 63 to swing on its pivots out of engaging position and permitting the bearing sleeve member 24 to make the full travel of the stroke. The up portion of stroke 4 and the down portion of the last stroke 5 of the setting are the same as described for stroke 1 above, except that on the up portion of stroke 4 the cam 51 as shown in the drawings is so shaped as to break the contacts of the secondary circuit. On the upward portion of stroke 5 the lip 74 also carried on arm 71 engages a projecting lug 75 on ratchet 44 and causes the shaft 48 to rotate one space and this is immediately followed by the lifting pawl 70 engaging the protruding tooth 70a and moving the dial another space so that on the last up stroke the shaft 48 is rotated twice and the dial moved two spaces. As the bearing sleeve approaches the upper portion of its travel, the trigger plate 38 is released to move into operative engagement with the extremity of arm 34. The release of the trigger plate is controlled by cam 39a. The plate 38 is so positioned as to hold the arm 34, and therefore the blade 30 of the swiveled "dog" member in the same position and thereby directing it to continue for the full length of the stroke. (See Fig. 12.) Immediately upon completion of the five strokes the cam 51 is so positioned back to "off" position shown in Fig. 16 that the motor circuit is broken and the movement stops.

In the movement described for setting at #5, the first downstroke has been between point 20 and 23, the first up portion between 23 and 22, the second and third strokes between points 23 and 22, the down portion of stroke 4 between point 22 and 21, the portion from 21 to 22 and the down portion of stroke 5 from point 22 to 23, and the up portion stroke from 23 to 20 to complete the setting.

Obviously, the device can be given any number of settings, and courses of travel by change of the shapes of cams 39a, 50 and 51, and the form of ratchet 44, as well as making or breaking of secondary circuits such as 66b and 67a which further add control and usefulness to the converted and varied reciprocating movement.

Also, other means than cams may be used for accomplishing the points of reversal. For example, contact pegs could be mounted so they would cut in magnets that in turn would operate the reversing means, thus making possible the reversal of direction of travel at any chosen point.

It is understood that the invention herein described and illustrated by way of example is capable of modification and change, and comprehends other details and constructions without departing from the concept of or the spirit of the invention.

I claim:

1. A device for the conversion of rotary movement to reciprocating movement including in combination, a shaft having an endless groove traversing the said shaft in two intersecting spirals with the intersections being rounded at the points of reversal, a swivelled "dog" member having a blade for traveling in said groove and provided with spaced projections sufficient to provide bearing at the intersections of the groove on both sides thereof in the same direction, means for assisting the reversing of the direction of travel short of the full travel in one direction and means carried by said swivelled "dog" member operated to directionally guide it for the full length traveled in the other direction before reversing.

2. A device for the conversion of rotary movement to reciprocating movement including in combination, a shaft having an endless groove traversing the said shaft in two intersecting spirals with the intersections being rounded at the points of reversal, a swiveled "dog" member traveling in said groove, a bearing sleeve member slidably mounted on said shaft for imparting the reciprocating movement and moved by said swiveled "dog" traveling in said groove, means for assisting the reversing of the direction of travel short of the full travel in one direction, and means carried by said swiveled "dog" member operating to directionally guide it for the full length of the travel in the other direction before reversing.

3. A device for the conversion of rotary movement to reciprocating movement including in combination, a shaft having an endless groove traversing the said shaft in two intersecting spirals with the intersections being rounded at the points of reversal, a swiveled "dog" member traveling in said groove, means for assisting the reversing of the direction of travel short of the full travel in one direction, means carried by said swiveled "dog" member operating to directionally guide it for the full length of the travel in the other direction before reversing, and means for placing said reversal assisting means in both directions of travel in or out of operative position during operation.

4. A device for the conversion of rotary movement to reciprocating movement including in combination, a shaft having an endless groove traversing it in two intersecting oppositely directed spirals with the groove intersections rounded at the points of reversal, a swiveled "dog" member traveling in said groove, means for assisting the reversing of the direction of travel short of the full travel in one direction, an arm carried by said swiveled "dog" member operating to directionally guide it for the full length of the travel in the other direction before reversing, and means for placing said reversal assisting means and said arm in or out of operative position in response to actuation in the course of travel.

5. A device for the conversion of rotary movement to reciprocating movement including in combination, a shaft having an endless groove traversing it in two intersecting oppositely directed spirals with the intersections rounded at the points of reversal, a swiveled "dog" member traveling in said groove, means for assisting the reversing of the direction of travel short of the full travel in one direction, an arm carried by said swiveled "dog" member operating to directionally guide it for the full length of the travel in the other direction before reversing, and means for placing said reversal assisting means and said arm in or out of operative engagement in response to cam settings and movement of the cams in response to actuation in the course of travel.

6. A machine for the conversion of rotary movement to reciprocating movement of varying length strokes including in combination, a shaft having an endless groove traversing a portion thereof in oppositely directed intersecting spirals with the intersections therein rounded at a plurality of places of reversal, a "dog" member adapted to travel in said groove, a bearing sleeve member slidably mounted on said shaft and moved by said "dog" member for imparting the reciprocating movement produced, stop means for assisting the reversal of direction short of the full travel in one direction and means carried on said "dog" member for operative engagement for full travel in the other direction.

7. A machine for the conversion of rotary movement to reciprocating movement of varying length strokes including in combination, a shaft having an endless groove traversing a portion thereof in oppositely directed intersecting spirals with the intersections therein rounded at a plurality of places of reversal, a "dog" member having a blade adapted to travel in said groove, a bearing sleeve member slidably mounted on said shaft and moved by said "dog" member for imparting the reciprocating movement produced, stop means for assisting the reversal of direction short of the full travel in one direction, means carried on said "dog" member for operative engagement for full travel in the other direction, and means for placing said means for controlling the length of travel in both directions in or out of engaging position during operation.

8. A machine for the conversion of rotary movement to reciprocating movement of varying length strokes including in combination, a shaft having an endless groove traversing a portion thereof in oppositely directed intersecting spirals with intersections therein rounded at a plurality of places of reversal, a "dog" member having a blade adapted to travel in said grooves, a bearing sleeve member slidably mounted on said shaft and moved by said "dog" member for imparting the reciprocating movement produced, stop means adapted to contact said bearing sleeve for assisting the reversal of direction short of the full travel in one direction, means carried on said "dog" member for operative engagement for full travel in the other direction, means for placing said means for controlling the length of travel in either direction in or out of engaging position, in response to actuation in the course of travel.

9. A machine for the conversion of rotary movement to reciprocating movement of varying length strokes including in combination, a shaft having an endless groove traversing a portion thereof in oppositely directed intersecting spirals with intersections therein rounded at a plurality of places of reversal, a "dog" member having a blade adapted to travel in said groove and provide bearing on both sides of the intersection in the same direction of travel, a bearing sleeve member slidably mounted on said shaft and moved by said "dog" member for imparting the reciprocating movement produced, stop means adapted to contact said bearing sleeve, for assisting the reversal of direction short of the full travel in one direction, means carried on said "dog" member for operative engagement for full travel in the other direction, and cam means for placing said means for controlling the length of travel in either direction in and out of operative engagement during operation.

10. A machine for the conversion of rotary movement to reciprocating movement of varying length strokes including in combination, a shaft having an endless groove traversing a portion thereof in oppositely directed intersecting spirals with intersections therein rounded at a plurality of places of reversal, a "dog" member having a blade adapted to travel in said groove, a bearing sleeve member slidably mounted on said shaft and moved by said "dog" member for imparting the reciprocating movement produced, stop means adapted to contact said bearing sleeve, for assisting the reversal of direction short of the full travel in one direction, means carried on said "dog" member for operative engagement for full travel in the other direction, and cam means adapted for predetermined setting and actuated during the course of travel, for placing said means for controlling the length of travel in both directions in and out of operative engagement.

11. A device for the conversion of rotary movement to reciprocating movement including in combination, a shaft rotated by a source of power having intersecting oppositely directed spirals of an endless groove with intersections rounded at a plurality of points of reversal, a "dog" member traveling in said groove having projections providing bearing at both sides of an intersection in the same direction of travel, a slidably mounted sleeve member mounted on said shaft for imparting the reciprocating movement and moved by said "dog" member, means for assisting the reversing of the direction of travel short of the full travel in either direction.

12. A device for the conversion of rotary movement to reciprocating movement including in combination, a shaft rotated by a source of power having intersecting oppositely directed spirals of an endless groove with intersections rounded at a plurality of points of reversal, a "dog" member traveling in said groove, a slidably mounted sleeve member mounted on said shaft for imparting the reciprocating movement and moved by said "dog" member, means adapted to contact said bearing for assisting the reversing of the direction of travel short of the full travel in either direction, and cam means for placing said means for controlling the length of travel in either direction in and out of operative engagement during operation.

13. A device for the conversion of rotary movement to reciprocating movement including in combination, a shaft rotated by a source of power having intersecting oppositely directed spirals of an endless groove with intersections rounded at a plurality of points of reversal, a "dog" member traveling in said groove, a slidably mounted sleeve member mounted on said shaft for imparting the reciprocating movement and moved by said "dog" member, means adapted to contact said bearing for assisting the reversing of the direction of travel short of the full travel in either direction and cam means for placing said means for controlling the length of travel in and out of operative engagement in response to actuation in the course of travel.

14. A device for the conversion of rotary movement to reciprocating movement including in combination, a shaft rotated by a source of power having intersecting oppositely directed spirals of an endless groove with intersections rounded at a plurality of points of reversal, a "dog" member traveling in said grooves, a slidably mounted sleeve member mounted on said shaft for imparting the reciprocating movement and moved by said "dog" member, means adapted to contact said bearing for assisting the reversing of the direction of travel short of the full travel in either direction and means adapted for predetermined setting, for placing said means for controlling the length of travel in and out of operative engagement in response to actuation in the course of travel.

15. A device of the class described comprising in combination a shaft having an endless groove traversing a portion thereof in oppositely directed intersecting spirals, a bladed "dog" member adapted for travel in said groove, a member slidably mounted on said shaft for imparting reciprocated movement and moved by said "dog" member, control means for setting the length of the circuits of travel in both directions operative by the course of travel of the slidable member and the "dog" member.

16. A device of the class described comprising in combination a shaft having an endless groove traversing a portion thereof in oppositely directed intersecting spirals, a bladed "dog" member adapted for travel in said groove, a member slidably mounted on said shaft for imparting reciprocated movement and moved by said "dog" member, control means for setting the number and length of the circuits of travel in both directions operative by the course of travel of the slidable member and the "dog" member.

ERNEST E. LINDSEY.